(12) United States Patent
Yoshinaga et al.

(10) Patent No.: US 7,388,815 B2
(45) Date of Patent: Jun. 17, 2008

(54) WIRING LAYOUT STRUCTURE FOR OPTICAL HEAD DEVICE

(75) Inventors: Chikashi Yoshinaga, Nitta-Gun (JP); Hideyuki Saikawa, Ora-Gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 645 days.

(21) Appl. No.: 11/075,224

(22) Filed: Mar. 8, 2005

(65) Prior Publication Data

US 2005/0270914 A1 Dec. 8, 2005

(30) Foreign Application Priority Data

Jun. 4, 2004 (JP) ............................. 2004-166494

(51) Int. Cl.
*G11B 7/00* (2006.01)
(52) U.S. Cl. ................. 369/44.14; 369/44.11
(58) Field of Classification Search ............. 369/44.11, 369/44.14
See application file for complete search history.

(56) References Cited

U.S. PATENT DOCUMENTS

| | | | |
|---|---|---|---|
| 5,481,515 A * | 1/1996 | Kando et al. ............ | 369/44.12 |
| 5,528,403 A * | 6/1996 | Kawaguchi et al. ........ | 349/149 |
| 5,559,571 A * | 9/1996 | Miyamoto et al. ............ | 396/52 |
| 5,930,221 A * | 7/1999 | Kumita ....................... | 369/116 |
| 6,831,882 B1 * | 12/2004 | Tanaka et al. ........... | 369/44.14 |
| 6,996,035 B2 * | 2/2006 | Negishi et al. .......... | 369/44.11 |
| 2001/0028621 A1 * | 10/2001 | Moriyama ............. | 369/112.23 |
| 2003/0202454 A1 * | 10/2003 | Negishi et al. ............. | 369/121 |

FOREIGN PATENT DOCUMENTS

JP 2001-339182 12/2001

OTHER PUBLICATIONS

JP 2001-339182, Jul. 2001, Structure for attaching semiconductor, Yamashita Tatsumaro (English Translation).*

* cited by examiner

*Primary Examiner*—Wayne Young
*Assistant Examiner*—Van T. Pham
(74) *Attorney, Agent, or Firm*—Pillsbury Winthrop Shaw Pittman LLP

(57) ABSTRACT

A fixture plate is fixed by a screw onto an optical housing of the optical head device at a portion corresponding to where a monitor signal path portion and an act signal path portion are arranged overlapping one another. The two signal path portions are portions of two types of signal paths discretely formed on a flexible wiring board. The fixture plate is composed of a conductive material. One of the monitor signal path portion and the act signal path portion is covered by the fixture plate and fixed by a screw onto the optical housing together with the fixture plate, while the other of the monitor signal path portion and the act signal path portion is hooked in place by a hook provided on the fixture plate. The fixture plate is interposed between the monitor signal path portion and the act signal path portion.

3 Claims, 4 Drawing Sheets

WIRING LAYOUT STRUCTURE FOR OPTICAL HEAD DEVICE

CROSS-REFERENCE TO RELATED APPLICATIONS

The entire disclosure of Japanese Application No. 2004-166494 including the specification, claims, drawings, and abstract is incorporated herein by reference.

BACKGROUND OF THE INVENTION

1. Field of the Invention

The present invention relates to a wiring layout structure in an optical head device for reading and/or writing signals on a signal recording medium by means of a laser beam irradiated from a laser source.

2. Description of the Related Art

In a typical optical head device, an actuator for driving an objective lens is mounted on an optical housing. Various optical components other than the objective lens are also assembled on the optical housing. The optical head device comprises a semiconductor laser which serves as the light source, a photodetector for receiving laser light which has been reflected off of a signal recording medium, and a semiconductor integrated circuit for driving the semiconductor laser. The optical head device further includes electrical components such as a coil, a capacitor, a resistor for setting a circuit constant and a front monitor diode for receiving and monitoring the laser beam irradiated from the semiconductor laser so as to maintain the amount of light output from the laser at a predetermined level.

The actuator for driving the objective lens is composed of a permanent magnet, yoke, and various drive coils (focus coil and tracking coil, along with a tilt coil when necessary). Drive signals are supplied to the various drive coils.

In the optical head device, a flexible wiring board is employed to interconnect the electrical components provided in the optical head device and to supply drive signals to the various drive coils. The flexible wiring board generally comprises FPC (Flexible Printed Circuit).

Positions of the electrical components provided in the optical head device and positions of the terminals for supplying drive signals to the various drive coils are determined while taking into account the optical arrangement, connection relationships among the electrical components, and the position of the actuator. In addition, a desirable arrangement of the components may be devised by folding the flexible wiring board. As a result, the designed shape of the flexible wiring board is often complex, with branched portions.

The front monitor diode must be arranged within a branch light path formed by branching from the light path extending from the laser source to the signal recording medium. Accordingly, a signal path portion formed on the flexible wiring board for connecting to the front monitor diode is generally arranged in a central portion of the optical head device. The signal path portion for connecting to the front monitor diode may be positioned on an upper surface of the optical housing at a portion at which the actuator is mounted.

Further, the signal path portion formed on the flexible wiring board for connecting to a relay portion which relays drive signals to be supplied to the respective drive coils of the actuator is generally arranged adjacent to the portion of the optical housing at which the actuator is mounted.

As described above, the signal path portion for connecting to the front monitor diode and the signal path portion for connecting to the relay portion, which are both formed on the flexible wiring board, a repositioned adjacent to the actuator. The flexible wiring board may be held in position while being bent along the contour of the optical head device. Because of the restorative force of the flexible wiring board generated at a bent portion, there exists a risk that the signal path portions which are formed on the flexible wiring board and positioned adjacent to the actuator inadvertently contact the movable components of the actuator including the objective lens holder and a support member (such as a suspension wire) for supporting the lens holder while enabling displacement of the lens holder.

Moreover, because the signal path portion for connecting to the front monitor diode and the signal path portion for connecting to the relay portion are located close to one another, the conventional configuration described above results in a crowded arrangement of the signal path portions.

SUMMARY OF THE INVENTION

The present invention provides a wiring layout structure in an optical head device for performing one or both of reading and writing of signals on a signal recording medium by means of a laser beam irradiated from a laser source. The optical head device includes a flexible wiring board for electrical interconnection. In conjunction with this wiring layout structure, a fixture plate is fixed by a screw onto an optical housing of the optical head device at a portion corresponding to where a first signal path portion and a second signal path portion are arranged to overlap one another. The first and second signal path portions are portions of different types of signal paths discretely formed on the flexible wiring board. The fixture plate is composed of a conductive material. One of the first signal path portion and the second signal path portion is covered by the fixture plate and fixed by a screw onto the optical housing together with the fixture plate. The other of the first signal path portion and the second signal path portion is hooked in place by a hook provided on the fixture plate. The fixture plate is interposed between the first signal path portion and the second signal path portion.

DESCRIPTION OF THE PREFERRED EMBODIMENT

Figure 1:
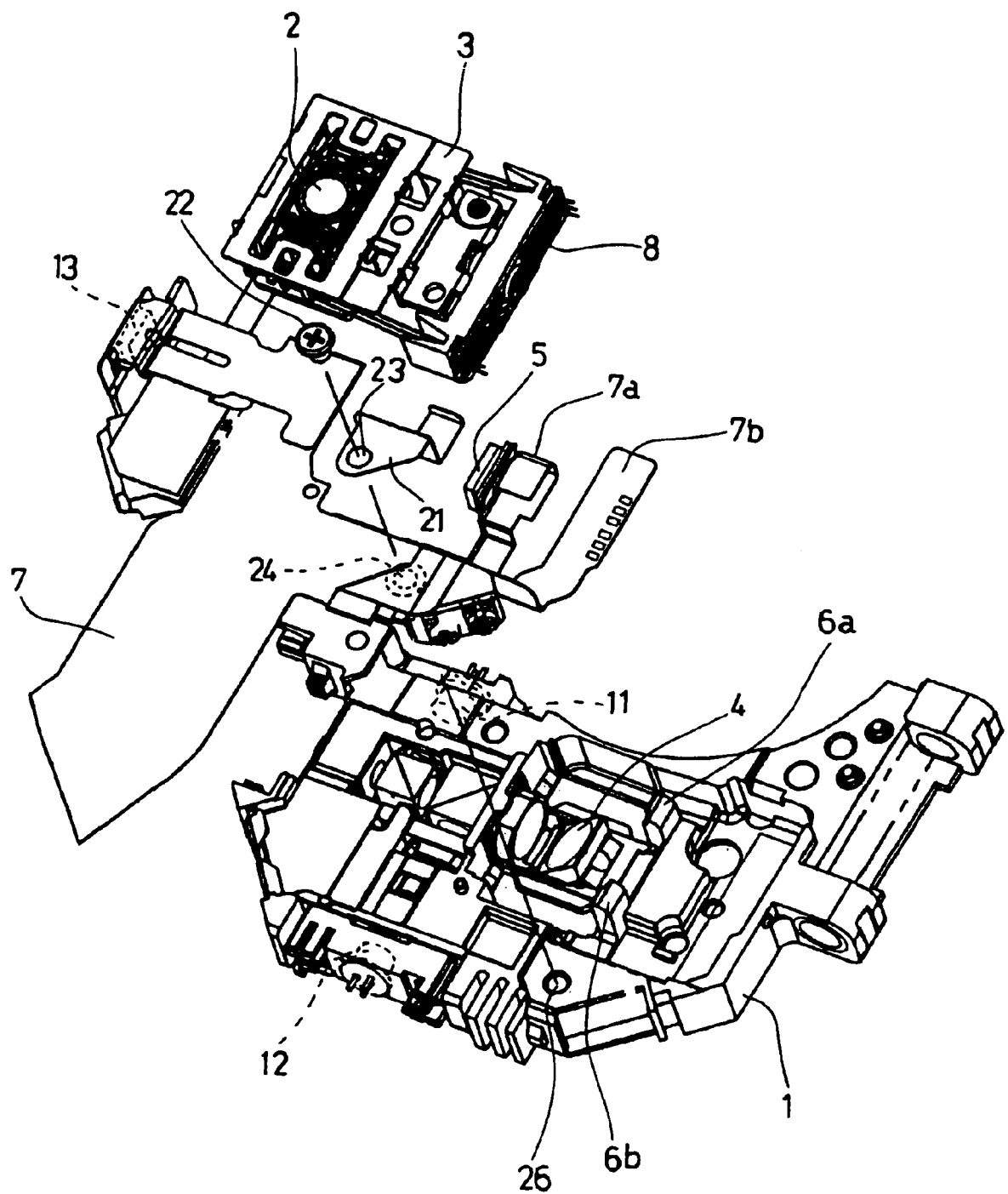
FIG. 1 is an exploded perspective view showing an embodiment of the wiring layout structure for an optical head device according to the present invention.

FIG. 1 is an exploded perspective view showing an embodiment of the wiring layout structure for an optical head device according to the present invention. More specifically, FIG. 1 shows an example optical head device employed for signal recording and reproduction with respect to both DVDs and CDs.

Figure 2:
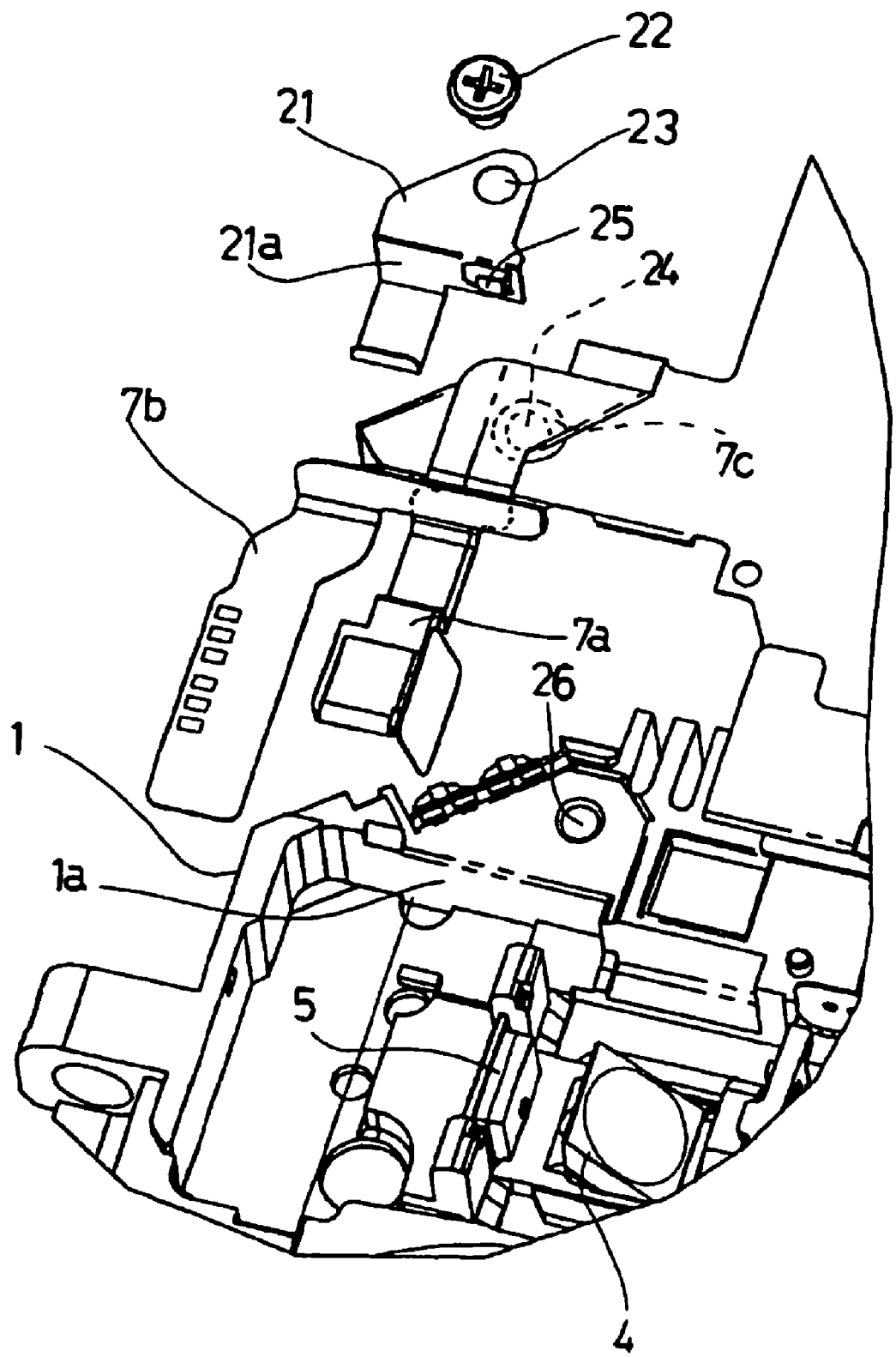
FIG. 2 is an exploded perspective view of an essential portion in FIG. 1 viewed from a different direction.
Figure 3:
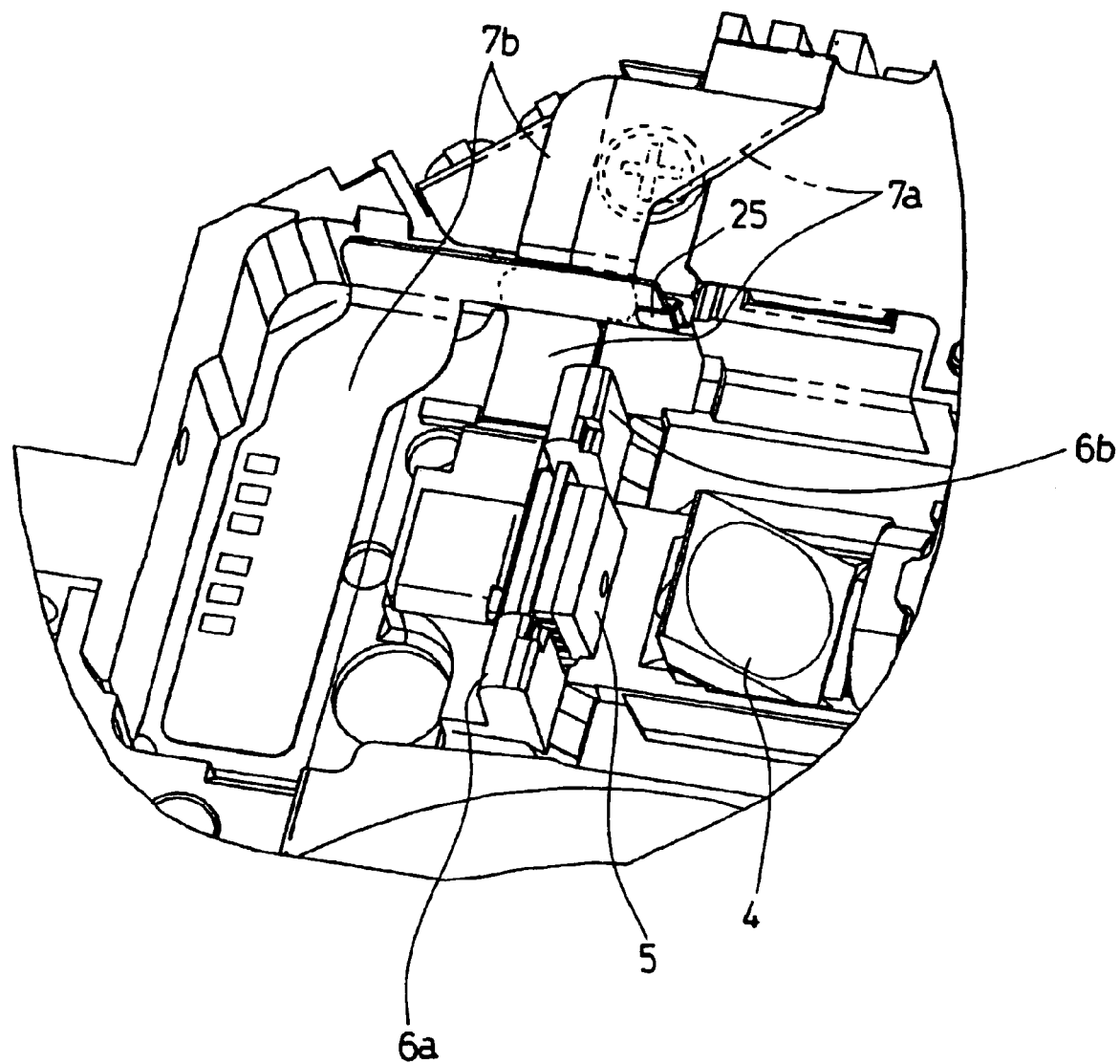
FIG. 3 is a perspective view showing the wiring layout structure for an optical head device shown in FIG. 2 in an assembled state.

FIG. 2 is an exploded perspective view of an essential portion in FIG. 1 viewed from a different direction. FIG. 3 is a perspective view showing the wiring layout structure for an optical head device shown in FIG. 2 in an assembled state.

The optical housing 1 is composed of die-cast aluminum. In the optical housing 1, an actuator 3 is provided, along with an incident light path and a reflection light path. The actuator 3 drives an objective lens 2. The incident light path introduces laser beams emitted from a laser source into the objective lens 2. The laser source includes a first laser diode 11 and a second laser diode 12, which emit laser beams having appropriate wavelengths for DVDs and CDs, respectively. Through the objective lens, a laser beam is converged and irradiated on a disc. The reflection light path introduces a laser beam reflected off of a disc (either DVD or CD) into a photodetector 13, allowing the photodetector 13 to receive the laser beam. A bend-up mirror 4 for bending a light beam is arranged within the incident light path before reaching the objective lens 2.

Two support protrusions 6a, 6b are formed as integral portions of the optical housing 1 in positions behind the bend-up mirror 4 opposite from the incident direction of the laser beam. A front monitor diode 5 is mounted onto the support protrusions 6a, 6b with its light-receiving surface oriented toward the bend-up mirror 4, such that a portion of the laser beam which is transmitted through the bend-up mirror 4 is introduced into the front monitor diode 5. The two side portions of the front monitor diode 5 are preferably fixed onto the support protrusions 6a, 6b, respectively, by means of an adhesive.

The bend-up mirror 4 comprises a leak mirror which generates transmissive leaks when irradiated with laser light having component wavelengths matching that of light emitted by the first laser diode 11 and the second laser diode 12. The bend-up mirror 4 is designed to have transmissivity of several percent with respect to the wavelengths of laser beams emitted by the first and second laser diodes 11, 12. The transmissivity may be approximately 5%, for example. The mirror surface of the bend-up mirror 4 may be formed by depositing an aluminum coating on a glass plate by ion assisted deposition.

Accordingly, a portion of the laser light emitted by the first 11 or second laser diode 12 is transmitted through the bend-up mirror 4 during the travel of the laser beam to the disc, and received by the front monitor diode 5.

The laser light received by the front monitor diode 5 is controlled by an APC circuit (not shown) such that the a constant level of light is received. In other words, the emissive output of the laser beams emitted by the first and second laser diodes 11, 12 are each maintained at a constant level by the APC circuit.

A flexible wiring board 7 is employed to provide electrical connection to the front monitor diode 5. The flexible wiring board 7 serves as a transmission cable for connecting between the optical head device and a circuit board (not shown) provided in the apparatus in which the optical head device is installed. The flexible wiring board 7 generally comprises FPC (Flexible Printed Circuit). The flexible wiring board 7 is not only connected to the front monitor diode 5, but is connected to or mounted with various electrical components such as the first and second laser diodes 11, 12, the photodetector 13 for receiving a laser beam reflected off of a DVD or CD, and laser-driving semiconductor integrated circuits (not shown) for driving the respective ones of the first and second laser diodes 11, 12.

The flexible wiring board 7 is fabricated by forming conductive patterns made of copper foil on a base film composed of a resin film such as polyimide. In regions other than the land regions in which the conductive patterns can be soldered, the flexible wiring board 7 is coated with a cover film made of a resin film such as polyimide.

Figure 4:
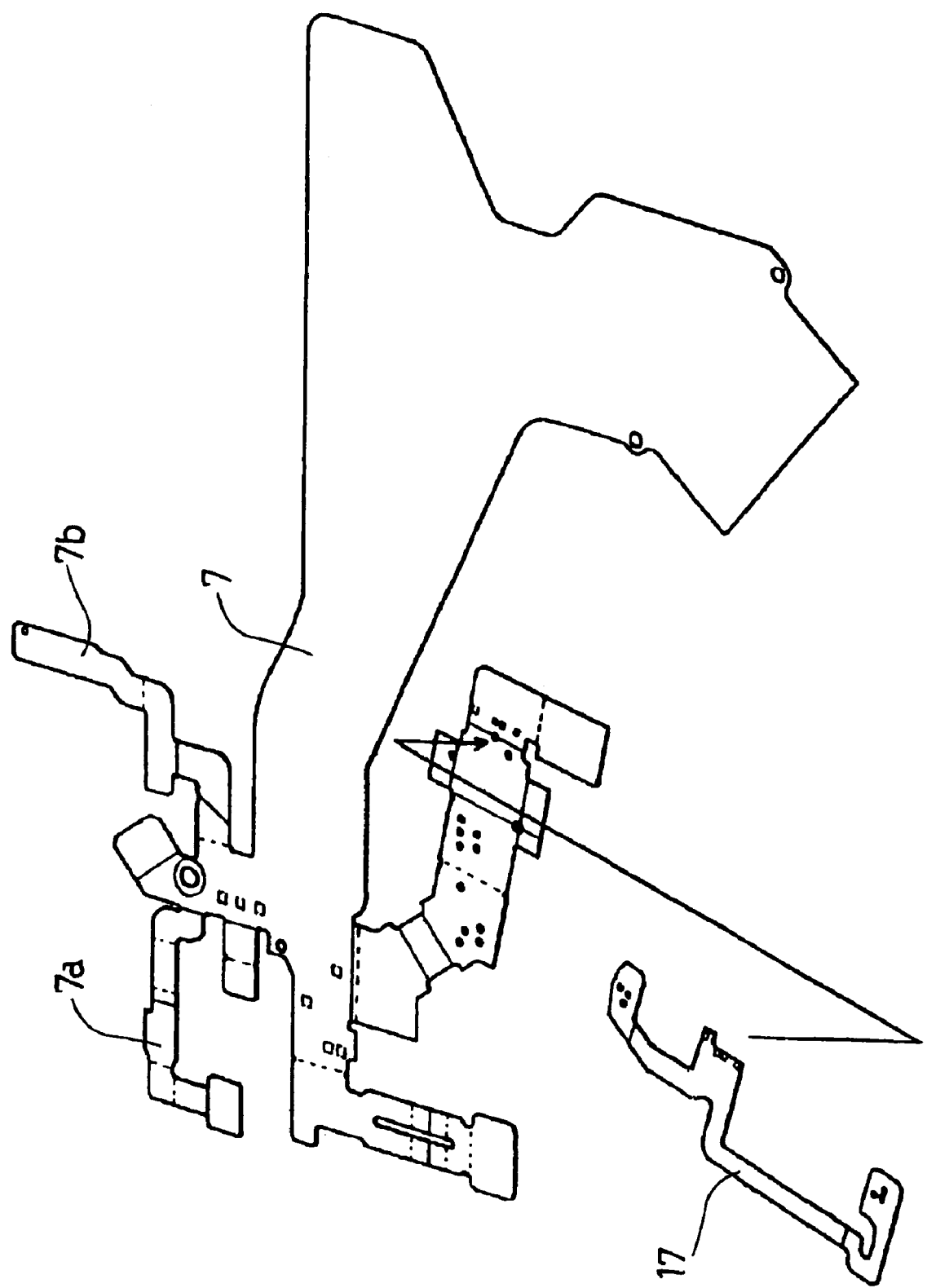
FIG. 4 shows the contour of the flexible wiring board 7, and explains how the flexible wiring board 7 is folded.

FIG. 4 depicts the flexible wiring board 7 employed in the above-described wiring layout structure of the optical head device. The positions at which the various electrical components are connected to or mounted on the flexible wiring board 7 and arranged within the optical head device 1 are determined by the contour of the flexible wiring board 7 and the manner in which the flexible wiring board 7 is folded on predetermined ridge lines (denoted by solid lines) and valley lines (denoted by broken lines) in FIG. 4.

The first and second laser diodes 11, 12 are mounted on a separate sub-board 17 which is fixed on the flexible wiring board 7 as shown in FIG. 4. In other words, the first and second laser diodes 11, 12 are indirectly mounted on the flexible wiring board 7 via the sub-board 17.

The actuator 3 is placed on the upper surface of the optical housing 1 while the flexible wiring board 7 is disposed in the optical housing 1. A monitor signal path portion 7a of the flexible wiring board 7, which connects to the front monitor diode 5, is positioned in the central portion of the optical housing 1. More specifically, the monitor signal path portion 7a is generally arranged at the portion of the upper surface of the optical housing 1 where the actuator 3 is placed.

The flexible wiring board 7 further includes an act signal path portion 7b for relaying drive signals supplied to the drive coils of the actuator 3 such as a focus coil, tracking coil, and tilt coil. The act signal path portion 7b connects to a printed circuit board 8 of the actuator 3. The act signal path portion 7b is arranged adjacent to the portion of the optical housing 1 where the actuator 3 is placed. In a concavity of the optical housing 1 where the actuator 3 is placed, the monitor signal path portion 7a and the act signal path portion 7b are generally arranged adjacent to one another. More specifically, as can be seen in FIG. 2, at an edge of the concavity, the proximal end portion of the monitor signal path portion 7a (i.e., the portion close to where the monitor signal path portion 7a branches from the main body of the flexible wiring board 7) is placed in an overlapping arrangement with the proximal end portion of the act signal path portion 7b.

In the position where the monitor signal path portion 7a and the act signal path portion 7b are overlapped, a fixture plate 21 is fixed on the optical housing 1 by a screw 22 so as to be placed between the monitor signal path portion 7a and the act signal path portion 7b. The screw 22 extends through a hole 23 in the fixture plate 21. The screw 22 also extends through a hole 24 formed at a corresponding portion in the flexible wiring board 7. A threaded hole 26 is formed in the optical housing 1 such that the screw 22 can be screwed fit. With this arrangement, the monitor signal path portion 7a can be fixed on the optical housing 1 while being covered by the fixture plate 21.

Because FIGS. 1 and 2 show the flexible wiring board 7 in a folded state, the fixture plate 21 may appear to also cover the act signal path portion 7b in those drawings. However, it should be noted that, in accordance with the above description, the act signal path portion 7b actually lies over the fixture plate 21 screwed onto the optical housing 1.

The fixture plate 21 may be formed by shaping a metal sheet such as a stainless steel sheet. The fixture plate 21 comprises a step portion 21a which is arranged conforming to a stepped portion formed by a wall 1a defining the concavity of the optical housing 1. The fixture plate 21 is shaped in accordance with the shape of the monitor signal path portion 7a.

The act signal path portion 7b is arranged overlapping the fixture plate 21, and is hooked in place by a hook 25 formed on the step portion 21a of the fixture plate 21. With this arrangement, a segment of the act signal path portion 7b which is bent along the stepped portion constituting the concavity is prevented from protruding toward the actuator 3 due to the restorative property of the flexible wiring board 7.

The fixture plate 21 is composed of a metal sheet and is therefore electrically conductive. Further, the screw for fixing the fixture plate 21 and the optical housing 1 made of die-cast aluminum are also electrically conductive. A land region 7c provided surrounding the hole 24 of the flexible wiring board 7 is directly coupled to a grounding pattern. When the fixture plate 21 is screwed onto the optical housing 1, the land region 7c is pressed against the back side of the fixture plate 21. Accordingly, the ground of the flexible wiring board 7 is connected to the fixture plate 21 at the screw portion. The fixture plate 21 is thereby set to the ground potential.

As noted above, the fixture plate 21 is interposed between the monitor signal path portion 7a and the act signal path portion 7b in the position where the monitor signal path portion 7a and the act signal path portion 7b are overlapped. The fixture plate 21 serves as a shield plate between the monitor signal path portion 7a and the act signal path portion 7b. In particular, the act signal path portion 7b is shielded against noises radiated from the monitor signal path portion 7a when a laser beam produced by the first laser diode 11 or second laser diode 12 in accordance with a drive signal is received.

When the ground of the flexible wiring board 7 is connected to the fixture plate 21 at a portion other than the screw portion, it is unnecessary to provide the land region 7c surrounding the hole 24 of the flexible wiring board 7.

While the fixture plate 21 is made of a metal sheet in the above-described embodiment, it may also be preferable to alternatively form the fixture plate 21 from a non-conductive base material covered with a metal coating (such as silver). By providing a metal coating, the fixture plate 21 can be made conductive so as to achieve the shield effect.

According to the above-described embodiment of the present invention, one of the first signal path portion and the second signal path portion is fastened together with the fixture plate screwed onto the optical housing, while the other of the first signal path portion and the second signal path portion is hooked in place by the hook of the fixture plate. With this arrangement, both the first and second signal path portions can be positioned along the optical housing by means of one fixture plate. Further, when the first and second signal path portions are arranged close to the actuator, the above-described arrangement can prevent the signal path portions from contacting the actuator.

Moreover, because the fixture plate composed of a conductive material is interposed between the first signal path portion and the second signal path portion, the first and second signal path portions are shielded from one another, preventing cross-talk between those signal path portions. In particular, during when the front monitor element is receiving a laser beam produced by the semiconductor laser in accordance with a drive signal, the second signal path portion can be shielded against noises radiated from the first signal path portion which is connected to the front monitor element.

What is claimed is:

1. A wiring layout structure in an optical head device for performing one or both of reading and writing of signals on a signal recording medium by means of a laser beam irradiated from a laser source, the optical head device including a flexible wiring board for electrical interconnection, the wiring layout structure wherein:

a fixture plate is fixed by a screw onto an optical housing of the optical head device at a portion corresponding to where a first signal path portion and a second signal path portion are arranged overlapping one another, the first and second signal path portions being portions of different types of signal paths discretely formed on the flexible wiring board;

the fixture plate is composed of a conductive material; and one of the first signal path portion and the second signal path portion is covered by the fixture plate and fixed by a screw onto the optical housing together with the fixture plate, while the other of the first signal path portion and the second signal path portion is hooked in place by a hook provided on the fixture plate, and the fixture plate is interposed between the first signal path portion and the second signal path portion.

2. A wiring layout structure of an optical head device as defined in claim 1, wherein the optical housing of the optical head device comprises various optical elements assembled thereon and an actuator placed therein for driving an objective lens; and the flexible wiring board is arranged at a position where the actuator is placed in the optical housing, and the fixture plate is fixed on the optical housing at a position corresponding to a position of a movable component of the actuator.

3. A wiring layout structure of an optical head device as defined in claim 2, wherein the optical head device comprises a bend-up mirror which is arranged within an incident light path of a laser beam irradiated from a laser source into the objective lens and serves to bend the laser beam, and a front monitor element which is arranged within a transmitting light path of the laser beam transmitting through the bend-up mirror and serves to detect intensity of the laser beam; and the first signal path portion formed on the flexible wiring board is connected to the front monitor element, and the second signal path portion formed on the flexible wiring board constitutes a path for supplying a drive signal for driving the actuator.

* * * * *